US006811134B2

(12) United States Patent
Stoecklein et al.

(10) Patent No.: US 6,811,134 B2
(45) Date of Patent: Nov. 2, 2004

(54) VALVE FOR CONTROLLING LIQUIDS

(75) Inventors: Wolfgang Stoecklein, Stuttgart (DE); Dietmar Schmieder, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 10/240,100

(22) PCT Filed: Feb. 1, 2002

(86) PCT No.: PCT/DE02/00369

§ 371 (c)(1), (2), (4) Date: Mar. 20, 2003

(87) PCT Pub. No.: WO02/061266

PCT Pub. Date: Aug. 8, 2002

(65) Prior Publication Data

US 2003/0155540 A1 Aug. 21, 2003

(30) Foreign Application Priority Data

Feb. 2, 2001 (DE) ........................................ 101 04 618

(51) Int. Cl.[7] ................................................ F16K 31/12

(52) U.S. Cl. ................. 251/57; 251/129.06; 251/30.01; 239/92; 239/533.2; 239/102.2

(58) Field of Search .............................. 251/57, 129.06, 251/30.01, 30.02, 30.03, 30.04, 30.05; 239/88, 89, 90, 91, 92, 96, 124, 533.2, 533.3, 533.11

(56) References Cited

U.S. PATENT DOCUMENTS

| | | | | |
|---|---|---|---|---|
| 5,779,149 A | * | 7/1998 | Hayes, Jr. | 239/124 |
| 6,581,850 B1 | * | 6/2003 | Boecking et al. | 239/102.2 |
| 6,616,064 B2 | * | 9/2003 | Boecking | 239/96 |

FOREIGN PATENT DOCUMENTS

| | | |
|---|---|---|
| EP | 0 477 400 A1 | 4/1992 |

* cited by examiner

*Primary Examiner*—Edward K. Look
*Assistant Examiner*—John K. Fristoe, Jr.
(74) *Attorney, Agent, or Firm*—Ronald E. Greigg

(57) ABSTRACT

A valve for controlling fluids, having a piezoelectric actuator unit for actuating a valve member that is disposed in an at least one-piece valve body and that has at least one displacement piston communicating with the actuator unit and at least one actuating piston operatively connected to the displacement piston via a hydraulic coupler, which actuating piston is connected to a valve closing member which cooperates with at least one valve seat and in the closing position disconnects a control chamber from an outlet chamber, the hydraulic coupler being provided with a filling device. The valve closing member has a pistonlike cylindrical region, which with the valve body forms at least one filter gap for the fluid to be delivered to the filling device, and at whose level an inlet conduit of the filling device branches off.

20 Claims, 3 Drawing Sheets

VALVE FOR CONTROLLING LIQUIDS

CROSS-REFERENCE TO RELATED APPLICATIONS

This application is a 35 USC 371 application of PCT/DE 02/00369, filed on Feb. 1, 2002.

BACKGROUND OF THE INVENTION

1. Field of the Invention

The invention is directed to an improved valve for controlling fluids.

2. Description of the Prior Art

Valves for controlling fluids of the type with which this invention is concerned are known in the industry and are used for instance in a fuel injection valve, in particular a common rail injector, of an internal combustion engine of a motor vehicle.

One such valve is described for instance in European Patent Disclosure EP 0 477 400 A1. For actuation, this valve has a piezoelectric actuator. For transmitting the deflection of the actuator to a valve closing member, the valve has a hydraulic chamber, which functions as a hydraulic booster or coupling and tolerance compensating element. The hydraulic chamber, between two pistons defining it, of which one piston has a smaller diameter and is connected to the valve closing member to be triggered and the other piston has a larger diameter and is connected to the piezoelectric actuator, encloses a common compensation volume. The smaller-diameter piston or so-called actuating piston executes a stroke that is increased by the boosting ratio of the piston diameters, when the larger-diameter piston, the so-called displacement piston, undergoes a certain deflection by means of the piezoelectric actuator. Moreover, via a compensation volume, the hydraulic chamber can compensate for tolerances resulting from temperature gradients or different coefficients of temperature expansion in the materials used as well as possible settling effects, without causing a change in the position of the valve closing member to be triggered.

The fluid pressure in the hydraulic coupler always drops upon actuation of the valve, because of leakage. For this reason, it is necessary that the hydraulic coupler be constantly replenished with suitable quantities of hydraulic fluid. In an injection valve, filling the coupler is done as a rule with fluid which is delivered to the injection valve at high pressure and which on the one hand represents the fluid to be injected by the injection valve into the engine and on the other is used to control the injection valve. Tapping the fluid is done via a leakage point, which for the sake of avoiding high pressure in the coupler has a small hydraulic cross section, for instance, or in other words a throttle restriction.

It proves problematic, however, that a throttle restriction of this kind can easily become plugged because of contaminants in the fluid flowing through it.

SUMMARY OF THE INVENTION

The valve of the invention in which the valve closing member has a pistonlike cylindrical region that together with the valve body forms at least one filter gap for fluid to be delivered to the filling device and at whose height an inlet conduit of the filling device branches off, has the advantage over the prior art that the risk of plugging up of a throttle restriction of the filling device, such as a throttle pin or throttle bore, is low, since the valve closing member in combination with the valve body forms a dirt filter for the fluid for filling the hydraulic coupler that flows through the throttle restriction.

The valve of the invention furthermore has the advantage that the dirt filter, formed of the valve body and the valve closing member, is a more or less self-cleaning dirt filter, since contaminants which may adhere in the region of the filter gap come loose again as a result of the motion of the valve closing member.

The invention is easy to realize by providing that the filter gap is achieved by guiding the pistonlike valve closing member closely on the valve body, for instance in an essentially correspondingly embodied bore therein. It is naturally important here that the inlet conduit branch off downstream from at least one filter gap. Otherwise, adequate filtering action could not be achieved.

In a preferred embodiment of the valve of the invention, the pistonlike region of the valve closing member is embodied on at least one annular protrusion of the valve body, which protrusion, embracing the valve closing member, together with the pistonlike region of the valve closing member forms the filter gap.

In an advantageous embodiment, the inlet conduit of the filling device can branch off from an annular chamber surrounding the pistonlike region of the valve closing member. This annular chamber is then expediently located downstream of the filter gap.

To enable furnishing the valve with a sufficient control quantity of fluid, the valve preferably has a control conduit, which establishes a communication between a chamber, embodied on the side of the valve closing member remote from the actuating piston, and the control chamber. The control chamber is disposed for instance such that it surrounds the region of the valve closing member that also includes the region of the valve closing member that cooperates with the valve seat.

Advantageously, a throttle can be embodied in the control conduit. If the valve of the invention is used in a common rail injector, in which the valve serves to control a so-called nozzle module and is connected to the nozzle module via a so-called outlet throttle, this throttle should have a larger cross section than the outlet throttle preceding it. Because of the throttle disposed in the control conduit, forces then ensue at the valve closing member that bring about fast closure of the valve closing member. This in turn, in an injection valve, assures small, stable injection quantities.

The control conduit can be embodied either in the valve closing member or in the valve body, depending on the preference of one skilled in the art.

In a special embodiment of the valve of the invention, the valve closing member is embodied in at least two parts. For instance, the valve closing member includes at least one substantially hemispherically shaped component, which cooperates with the valve seat, and one substantially cylindrically embodied component, which is guided on the valve body and with it forms the filter gap. This embodiment makes greater tolerances in producing the valve body possible, since when the hemispherically shaped component and the cylindrical region are embodied as displaceable radially relative to one another, the guide for the cylindrical region need not be embodied concentrically with the valve seat.

Adjusting a stroke of the valve closing member that occurs upon actuation of the actuating piston can be done by means of a stroke adjusting element, which is preferably embodied in the form of a disk and is disposed on the free face end of the valve closing member.

BRIEF DESCRIPTION OF THE DRAWINGS

Three exemplary embodiments of the valve of the invention are explained in further detail in the ensuing description, with reference to the drawings, in which.

DESCRIPTION OF THE PREFERRED EMBODIMENTS

Figure 1:
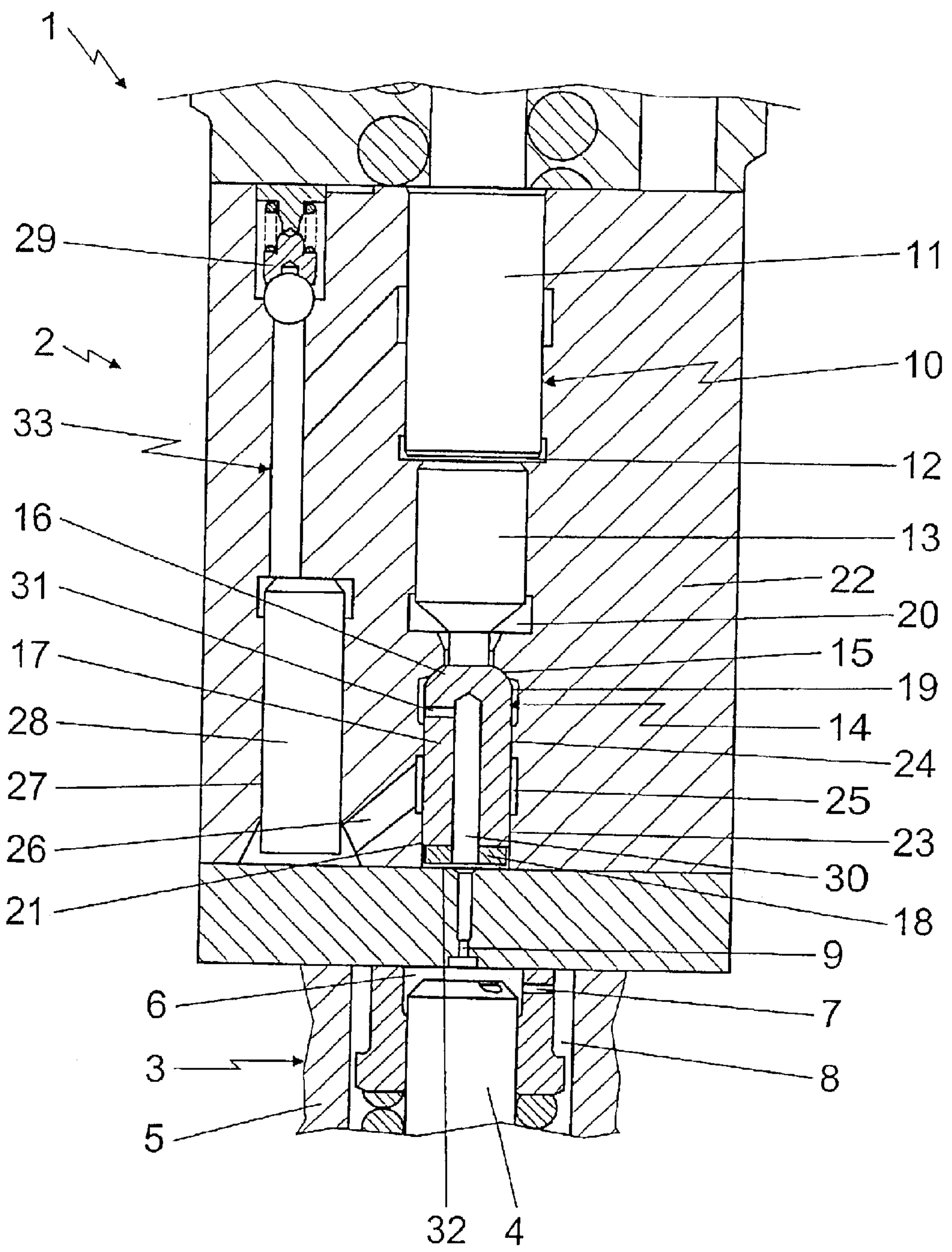
FIG. 1, a schematic detail of an injection valve for injecting fuel into an internal combustion engine, in longitudinal section.

The exemplary embodiment shown in FIG. 1 has a fuel injection valve 1, which is intended for installation in an internal combustion engine, known per se, of a motor vehicle and is embodied here as a common rail injector for injecting preferably Diesel fuel. For this purpose, the fuel injection valve 1 as its essential component units includes a valve control module 2 and a nozzle module 3.

The nozzle module 3 includes a valve control piston 4, which is disposed in a nozzle body 5 and is operatively connected, or forms a structural unit, with a nozzle needle, not shown, which controls an opening in the fuel injection valve 1 that leads to a combustion chamber of the internal combustion engine.

A so-called valve control chamber 6 borders the free face end, shown in FIG. 1, of the valve control piston 4. Via the pressure level prevailing in the valve control chamber 6, the location of the valve control piston 4 and thus the location of the nozzle needle are adjusted. To that end, the valve control chamber 6 communicates with the valve control module 2, via an inlet throttle 7 with a fuel delivery region, which contains fuel intended for injection, and via an outlet throttle 9.

The high-pressure delivery region 8 communicates with a high-pressure fuel reservoir, or so-called common rail, not shown here that is common to a plurality of injection valves. The fuel contained in the high-pressure delivery region 8 can thus be at a pressure of up to 1.5 kbar, for instance.

For adjusting an injection onset, injection duration and injection quantity, the injection valve 1 includes the valve control module 2, with a valve body 22, in which latter a valve member 10 is guided that can be actuated by means of a piezoelectric actuator unit, not shown here, of conventional design. The actuator unit is disposed on the side of the valve member 10 that is remote from the valve control piston 4 and thus from the combustion chamber of the engine.

The piezoelectric actuator engages a first piston 11, which is associated with the valve member 10 and forms the so-called displacement piston. The displacement piston 11 is operatively connected to a second piston 13, the so-called actuating piston, via a hydraulic coupler 12.

The hydraulic coupler 12 is embodied as a hydraulic chamber, and it transmits the axial deflection of the displacement piston 11, which is moved by means of the piezoelectric actuator unit, to the actuating piston 13. The hydraulic boosting has the effect that the actuating piston 13 executes a stroke that is lengthened by the boosting ratio of the piston diameters, when the displacement piston 11, which in the present case has a greater diameter than the actuating piston 13, is moved a certain distance by means of the piezoelectric actuator unit.

The actuating piston 13 serves to actuate a valve closing member 14, which cooperates with a valve seat 15 that is embodied here as a ball seat. The valve closing member 14, on its side toward the actuating piston 13, has a substantially hemispherically shaped component 16, which cooperates with the correspondingly shaped valve seat 15. The hemispherically shaped component 16 is adjoined, in the direction of the valve control piston 4, by a substantially piston-like cylindrical region 17, which in turn borders on an adjusting disk 18 for limiting the stroke of the valve closing member 14.

In the region of the hemispherically shaped component 16 of the valve closing member 14, this valve closing member is surrounded by a control chamber 19, which in the blocking position of the valve closing member 14 is disconnected from a so-called outlet chamber 20. From the outlet chamber 20, a return conduit, not shown here, branches off; it leads to a leakage connection of the injection valve 1, and this connection communicates with a fuel tank, also not shown here.

The valve closing member 14, and in particular the cylindrical region 17 of the valve closing member 14, is guided in a bore 21 of the valve body 22. Two annular, riblike protrusions 23 and 24 are formed on the wall of the bore 21; they form the guide for the valve closing member 14 and with it, each protrusion forms one filter gap. The cylindrical region 17 of the valve closing member 14 is guided so closely to the protrusions 23 and 24 that only a very narrow annular gap, which achieves a filter function for fuel, remains between the valve closing member 14 and the respective protrusion 23 and 24.

Between the protrusions 23 and 24 is an annular chamber 25, from which a conduit 26 for filling the hydraulic chamber 12 with hydraulic fluid branches off. The conduit 26 leads to a throttle pin 28, disposed in a bore 27 of the valve body 22, and downstream of the throttle pin, a conduit system 33 leads to the displacement piston 11, so that via the annular gap that defines the displacement piston 11, hydraulic fluid can be carried into the hydraulic chamber 12. The conduit system 33 is also equipped with an overpressure valve 29, so that in the hydraulic chamber 12, the pressure established by means of this valve 29 always prevails.

The valve closing member 14 also has a blind bore 30, which is made in the valve closing member 14 from the side thereof toward the outlet throttle 9. The bore 30 is oriented axially. Branching off from the bore 30 is a conduit 31, embodied as a throttle, that leads to the control chamber 19. Via the bore 30 and the throttle 31, which together form a so-called control conduit, the requisite control quantity for actuating the injection valve 1 is carried from a chamber 32 downstream of the outlet throttle 9 into the control chamber 19.

The diameter of the throttle 31 is very much greater than that of the outlet throttle 9 preceding it. When the valve closing member 14 is opened, a pressure difference occurs at the throttle 31, and by means of this difference, forces can be exerted on the valve closing member 14. These forces bring about a fast closure of the valve closing member. This in turn is a prerequisite for small, stable injection quantities.

The fuel injection valve 1 of FIG. 1 functions as described below.

In the closed state of the fuel injection valve 1, that is, when no voltage is applied to the piezoelectric actuator unit, the valve closing member 14, or in other words its hemispherically shaped component 16, is located on the valve seat 15 associated with it. The valve closing member 14 is thus in the blocking position.

If the injection valve 1, or the injection nozzle, closed by means of the nozzle needle not shown here, is to be opened, a voltage is applied to the piezoelectric actuator unit, whereupon this unit expands suddenly in the axial direction, that is, the direction of the displacement piston 11. As a result, the displacement piston 11 is displaced in the direction of the actuating piston 13. This latter piston in turn trips a displacement, mediated via the hydraulic chamber 12, of the actuating piston 13 in the direction of the valve control piston 4, which in turn causes a displacement of the valve closing member 14 in this same direction as well. As a result, fuel contained in the control chamber 19 flows into the outlet chamber 20 and from there flows out into the return conduit, not shown. As a result, the pressure in the valve control chamber 6 decreases, causing the valve control piston 4 to move in reverse and causing the nozzle needle connected to it and forming a structural unit to uncover the opening leading to the combustion chamber of the engine.

Dirt that may have come to be deposited between the protrusions 23 and 24 on the cylindrical region 17 of the valve closing member 14, or in other words in the filter gaps, is detached again as a result of the axial displacement of the valve closing member 14 and the resultant forces of friction. This makes for self-cleaning filter gaps.

If the voltage applied to the piezoelectric actuator unit is disrupted, then the displacement piston 11 is returned in the direction of the actuator unit, thus reducing the pressure prevailing in the hydraulic chamber 12 and causing the valve closing member 14 and thus the actuating piston 13 also to be moved in the direction of the piezoelectric actuator unit, until the valve closing member 14 comes to rest in the valve seat 15. The rail pressure prevailing in the high-pressure delivery region 8 can then build up again in the valve control chamber 6. This is effected via the inlet throttle 7. As a result, the valve control piston 4 is displaced back into its closing position.

As at the transition to the open state of the valve closing member 14, once again cleaning of the filter gaps takes place during the closing motion of the valve closing member 14.

Figure 2:
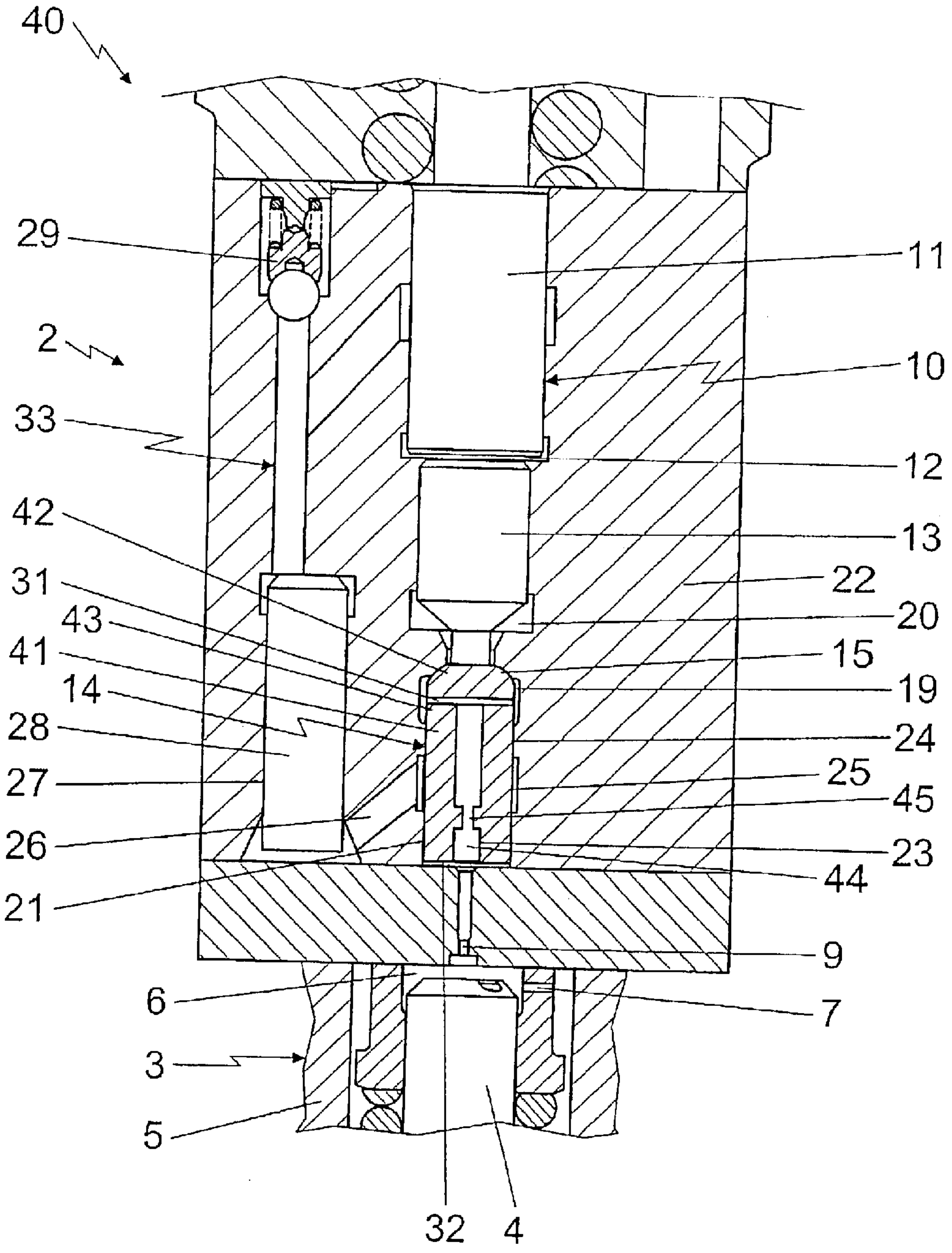
FIG. 2, a schematic illustration of a second embodiment of an injection valve, in a view corresponding to FIG. 1.

The exemplary embodiment of FIG. 2 differs from that of FIG. 1 in that the valve closing member 14 is embodied not in one part but in multiple parts. For the sake of simplicity, the same reference numerals as in FIG. 1 are used for components of equivalent function.

The valve closing member 14 comprises a substantially hemispherically shaped component 42, which is adjoined via a disk 43 by a substantially cylindrically embodied boltlike region 41. In the boltlike region 41, a conduit 44 is embodied, which is disposed axially, and a throttle 45 is embodied in it. The conduit 44 ends in the region of the disk 43 and establishes a communication between a chamber 32, defining the valve closing member 14 on its free face end, and the control chamber 19. Otherwise, the operation of the cylindrical region 41 is equivalent to that of the valve closing member of FIG. 1.

The valve closing member 14, in conjunction with the protrusions 23 and 24, accordingly has a filtering action for the fuel that is used to fill the hydraulic chamber 12 and that is carried via the conduit 26 and the throttle comprising the throttle pin 28 as well as the conduit system 33.

Figure 3:
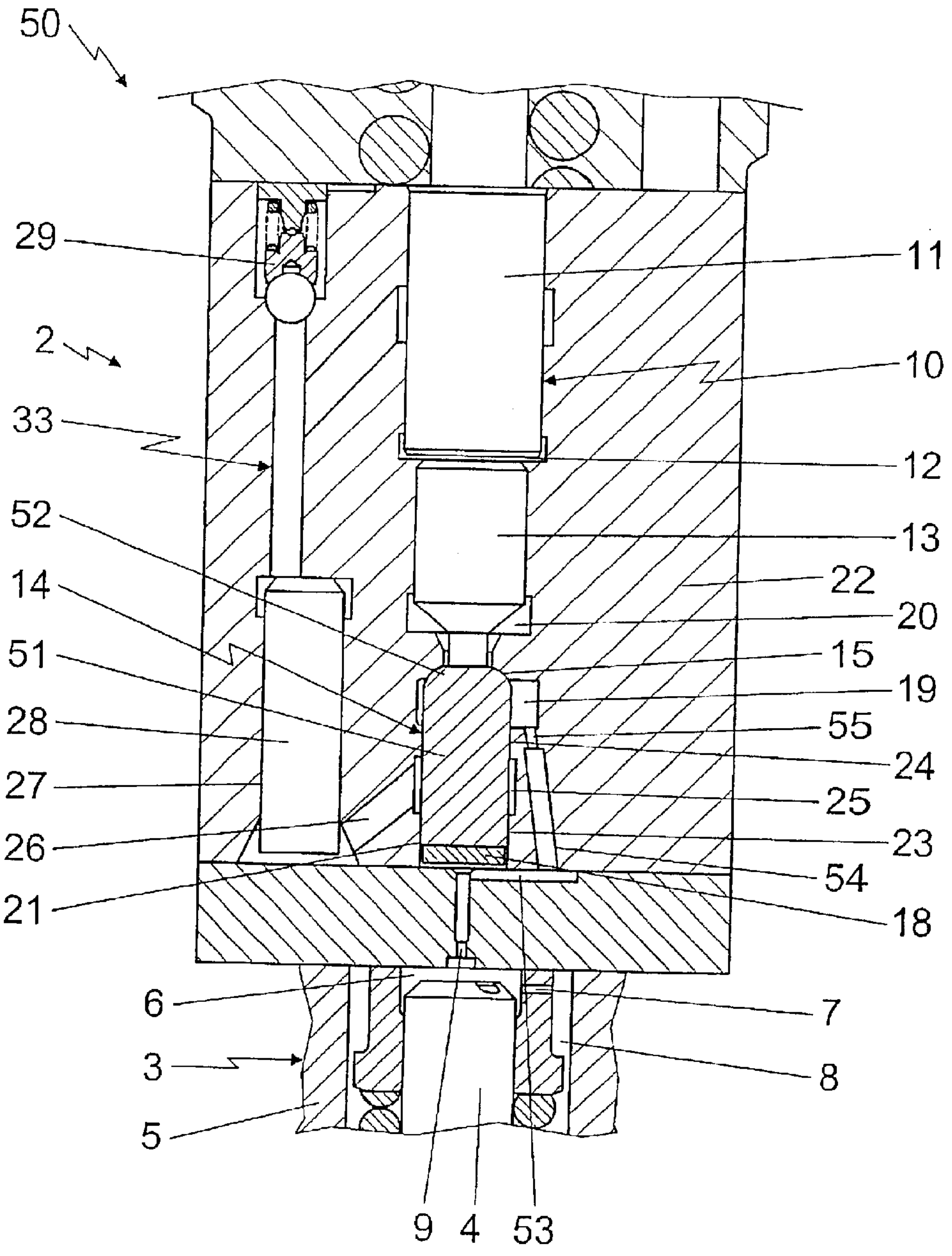
FIG. 3, a third embodiment of an injection valve, again in a view corresponding to FIG. 1.

The exemplary embodiment of FIG. 3 differs from those of FIGS. 1 and 2 in that here the valve closing member 14, which comprises one hemispherically shaped component 52 and one cylindrical region 51, is embodied in one piece and solidly. On the free face end, the valve closing member 14 is adjoined by an adjusting disk 18 for adjusting the stroke of the valve closing member 14. The injection valve 50 furthermore includes a chamber 53, substantially adjoining the adjusting disk 18, into which chamber fuel is carried via the outlet throttle 9, and from which chamber a control conduit 54 branches off that leads to the control chamber 19. A throttle 55 is disposed in the control conduit 54. The control conduit 54 and the throttle 55 are embodied in the valve body 22.

The mode of operation of the throttle 55 is essentially equivalent to that of the throttle 31 of the injection valve shown in FIG. 1.

The foregoing relates to preferred exemplary embodiments of the invention, it being understood that other variants and embodiments are possible within the spirit and scope of the invention, the latter being defined by the appended claims.

We claim:

1. In a valve for controlling fluids, having an piezoelectric actuator unit for actuating a valve member (10) disposed in an at least one-piece valve body (22) and that has at least one displacement piston (11) communicating with the actuator unit and at least one actuating piston (13) operatively connected to the displacement piston (11) via a hydraulic coupler (12), which actuating piston is connected to a valve closing member (14) which cooperates with at least one valve seat (15) and in the closing position disconnects a control chamber (19) from an outlet chamber (20), the hydraulic coupler (12) being provided with a filling device, the improvement wherein the valve closing member (14) has a pistonlike cylindrical region (17; 41; 51), which with the valve body (22) forms at least one filter gap for the fluid to be delivered to the filling device, and at whose level an inlet conduit (26) of the filling device branches off.

2. The valve of claim 1 wherein the pistonlike region (17; 41; 51) of the valve closing member (14) is embodied on at least one annular protrusion (23, 24) of the valve body (22), which at least one protrusion together with the pistonlike region (17; 41; 51) of the valve closing member (14) forms the filter gap.

3. The valve of claim 2 wherein the inlet conduit (26) of the filling device branches off from an annular chamber (25) surrounding the pistonlike region (17; 41; 51) of the valve closing member (14).

4. The valve of claim 3 further comprising a control conduit (30; 44; 54), which establishes a communication between a chamber (32; 53), and which is embodied on the side of the valve closing member (14) remote from the actuating piston (13), and of the control chamber (19).

5. The valve of claim 2 further comprising a control conduit (30; 44; 54), which establishes a communication between a chamber (32; 53), and which is embodied on the side of the valve closing member (14) remote from the actuating piston (13), and of the control chamber (19).

6. The valve of claim 2 further comprising a stroke adjusting element (18), preferably a stroke-adjusting disk on the valve closing member (14) on its free face end.

7. The valve of claim 1 wherein the inlet conduit (26) of the filling device branches off from an annular chamber (25) surrounding the pistonlike region (17; 41; 51) of the valve closing member (14).

8. The valve of claim 7 further comprising a control conduit (30; 44; 54), which establishes a communication between a chamber (32; 53), and which is embodied on the side of the valve closing member (14) remote from the actuating piston (13), and of the control chamber (19).

9. The valve of claim 7 further comprising a stroke adjusting element (18), preferably a stroke-adjusting disk on the valve closing member (14) on its free face end.

10. The valve of claim 1 further comprising a control conduit (30; 44; 54), which establishes a communication between a chamber (32; 53), and which is embodied on the side of the valve closing member (14) remote from the actuating piston (13), and of the control chamber (19).

11. The valve of claim 10 further comprising a throttle (31; 45; 55) embodied in the control conduit (30; 44; 54).

12. The valve of claim 11 wherein the control conduit (30; 44) is embodied in the valve closing member (14).

13. The valve of claim 11 wherein the control conduit (54) is embodied in the valve body (22).

14. The valve of claim 10 wherein the control conduit (30; 44) is embodied in the valve closing member (14).

15. The valve of claim 10 wherein the control conduit (54) is embodied in the valve body (22).

16. The valve of claim 10 further comprising a stroke adjusting element (18), preferably a stroke-adjusting disk on the valve closing member (14) on its free face end.

17. The valve of claim 1 wherein the valve closing member (14) is embodied in at least two parts.

18. The valve of claim 17 wherein the valve closing member (14) comprises at least one substantially hemispherically shaped component (42), which cooperates with the valve seat (15), and one substantially cylindrically embodied component (41).

19. The valve of claim 18 further comprising a stroke adjusting element (18), preferably a stroke-adjusting disk on the valve closing member (14) on its free face end.

20. The valve of claim 1 further comprising a stroke adjusting element (18), preferably a stroke-adjusting disk on the valve closing member (14) on its free face end.

* * * * *